United States Patent [19]

Kauth et al.

[11] Patent Number: 4,719,279
[45] Date of Patent: Jan. 12, 1988

[54] PROCESS FOR THE PREPARATION OF COPOLYPHOSPHONATES HAVING HIGH TOUGHNESS

[75] Inventors: Hermann Kauth, Krefeld; Klaus Reinking, Wermelskirchen; Dieter Freitag, Krefeld, all of Fed. Rep. of Germany

[73] Assignee: Bayer Aktiengesellschaft, Leverkusen, Fed. Rep. of Germany

[21] Appl. No.: 869,085

[22] Filed: May 30, 1986

[30] Foreign Application Priority Data

Jun. 7, 1985 [DE]  Fed. Rep. of Germany ....... 3520296

[51] Int. Cl.$^4$ ............................................. C08G 79/04
[52] U.S. Cl. ................................. 528/169; 525/462; 525/466; 525/538; 528/167
[58] Field of Search ................ 528/169, 167; 525/462, 525/466, 538

[56] References Cited

U.S. PATENT DOCUMENTS

| | | | |
|---|---|---|---|
| 2,682,522 | 6/1954 | Coover et al. | 528/169 |
| 4,223,104 | 9/1980 | Kim et al. | 528/169 |
| 4,322,520 | 3/1982 | Schmidt et al. | 528/169 |

*Primary Examiner*—Harold D. Anderson
*Attorney, Agent, or Firm*—Connolly & Hutz

[57] ABSTRACT

Polyester-phosphonates, polycarbonatophosphonates and polyester-carbonatophosphonates having improved impact strength and notched impact strength as compared with melt-condensation products can be prepared in such a way that, in the first stage, oligophosphonates with hydroxyl end groups are prepared by melt-transesterification and melt-condensation and these are subjected in a second stage to a phase boundary process.

10 Claims, No Drawings

PROCESS FOR THE PREPARATION OF COPOLYPHOSPHONATES HAVING HIGH TOUGHNESS

The invention relates to a two-stage process for the preparation of aromatic polyester-phosphonates having improved impact strength and notched impact strength, according to which, in the first stage, aromatic oligophosphonates with hydroxyl end groups are prepared by melt-transesterification and, in the second stage, the oligophosphonates thus obtained are condensed in a phase boundary reaction to give the polyester-phosphonates. The term "polyester-phosphonates" within the meaning of the invention includes polycarbonate-phosphonates and consequently also polyester-carbonato-phosphonates as well as mixtures of polyester-phosphonates and polycarbonato-phosphonates.

Aromatic polyester-phosphonates and aromatic polycarbonato-phosphonates are known (DE-AS (German Published Specifications) Nos. 1,199,499 and 1,199,500). They are prepared predominantly by the phase boundary process from bisphenolate, phosphonic acid dichlorides and dicarboxylic acid dichlorides or from bisphenol bis-chlorocarbonic acid esters (or their starting products bisphenol and phosgene) and phosphonic acid dichlorides. Because the use of phosphonic acid dichlorides in the phase boundary process readily causes the formation of emulsions, the phases of which are difficult or even impossible to separate, this preparation process has been unable to gain acceptance in practice.

Polyester-phosphonates and polycarbonato-phosphonates can also be prepared by melt-condensation from bisphenol, phosphonic acid esters and carboxylic acid esters or from bisphenol, phosphonic acid esters and diphenyl carbonate (compare, for example, DE-OS (German Published Specifications) Nos. 2,925,206 and 2,925,208). They possess a high heat distortion point, but do not meet very stringent demands on the impact strength and notched impact strength.

It was therefore the object of the invention to provide polyester-phosphonates having improved impact strength and notched impact strength as compared with melt-condensation products.

Surprisingly, it has now been found that a two-stage reaction is successful when, in a first stage, oligophosphonates with hydroxyl end groups are prepared by melt-transesterification and melt-condensation of phosphonic acid esters and diphenols and, in a second stage, and oligophosphonates are condensed with aromatic dicarboxylic acid chlorides and/or phosgene and optionally further diphenol by the phase boundary process to give polyester-phosphonates.

The invention thus relates to a process for the preparation of aromatic polyester-phosphonates with molecular weights $\overline{M}_n$, determined as the number averages, of 5,000 to 200,000, preferably from 10,000 to 150,000, especially from 12,000 to 80,000, and with molar phosphonate groups/(carboxylate plus carbonate groups) ratios of 95:5 to 5:95, preferably 80:20 to 10:90, especially 65:35 to 10:90, from 1) diphenols, 2) phosphonic acid derivatives and 3) aromatic dicarboxylic acid derivatives and/or phosgene, characterized in that, in a first stage, phosphonic acid diaryl esters are reacted in the melt with diphenols until an oligomeric product with a molecular weight $\overline{M}_n$, determined as the number average, of 460 to 20,000, preferably of 800 to 10,000, and an OH number of 5 to 240, preferably of 10 to 140, has been formed and then, in a second stage, the oligomeric product is condensed by the phase boundary process with aromatic dicarboxylic acid dichlorides and/or phosgene and optionally with further diphenols until the phenolic OH content is less than 0.1, preferably less than 0.05% by weight relative to the resulting polyester-phosphonate.

Preferred diphenols for use in the first and optionally in the second stage of the process according to the invention are compounds of the formula

wherein Z denotes a divalent mononuclear or polynuclear aromatic radical having 6-30 C atoms, Z being of such a structure that the two OH groups are each bonded directly to a C atom of an aromatic system.

Particularly preferred diphenols are compounds of the formula

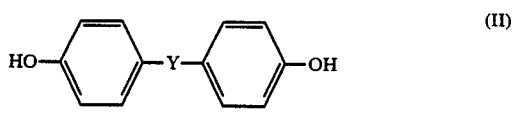

in which
Y denotes a single bond, an alkylene or alkylidene radical having 1-7 C atoms, a cycloalkylene or cycloalkylidene radical having 5-12 C atoms,

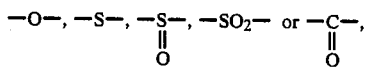

and nuclear-alkylated and nuclear-halogenated derivatives thereof, for example hydroquinone, resorcinol, dihydroxydiphenyls, bis-(hydroxyphenyl)-alkanes, bis-(hydroxyphenyl)-cycloalkanes, bis-(hydroxyphenyl)-sulphides, bis-(hydroxyphenyl)ethers, bis-(hydroxyphenyl)ketones, bis-(hydroxyphenyl)sulphoxides, bis-(hydroxyphenyl)sulphones and α,α'-bis-(hydroxyphenyl)-diisopropylbenzenes as well as nuclear-alkylated and nuclear-halogenated compounds thereof and the mixtures of such diphenols.

The most important diphenols may be listed as follows: bisphenol A, 2,2-bis-(3-methyl-4-hydroxyphenyl)-propane, 2,2-bis-(3,5-dimethyl-4-hydroxyphenyl)-propane, 1,1-bis-(4-hydroxyphenyl)-isobutane, 2,4-bis-(4-hydroxyphenyl)-2-methylbutane, 1,1-bis-(4-hydroxyphenyl)-cyclohexane, 4,4'-dihydroxydiphenyl sulphide, 4,4'-dihydroxydiphenyl, 4,4'-dihydroxydiphenyl sulphone as well as di- and tetra-halogenated derivatives thereof and any desired mixtures of the said diphenols.

Preferred phosphonic acid diaryl esters which can be employed for the reaction in the first stage of the process according to the invention are of the formula

wherein
R denotes $C_1$–$C_{12}$- and preferably $C_1$–$C_4$-alkyl, in particular methyl, $C_2$–$C_{12}$- and preferably $C_2$–$C_4$-alkenyl, $C_6$–$C_{30}$- and preferably $C_6$–$C_{12}$-cycloalkyl, $C_6$–$C_{30}$- and preferably $C_6$–$C_{12}$-cycloalkenyl, $C_6$–$C_{30}$- and preferably $C_6$–$C_{10}$-aryl, in particular phenyl, $C_7$–$C_{30}$- and preferably $C_7$–$C_{12}$-aralkyl, $C_7$–$C_{30}$- and preferably $C_7$–$C_{12}$-aralkenyl, the aromatic nuclei being unsubstituted or substituted by 1 to 5 $C_1$–$C_4$- and preferably $C_1$–$C_2$-alkyl groups, by 1 to 5 halogen atoms (F, Cl or Br) or by the said alkyl groups and halogen atoms, and $Ar^1$ and $Ar^2$ denote phenyl radicals which are unsubstituted or substituted by 1 to 5 $C_1$–$C_4$-alkyl radicals.

The preferred phosphonic acid esters are phenylphosphonic acid esters; the most preferred phosphonic acid esters, however, are the methylphosphonic acid esters. Normally, the phosphonic acid diphenyl esters will be used for cost reasons.

The first stage of the process according to the invention can be accelerated by catalysts. Examples of preferred catalysts are alcoholates and phenolates of the alkali and alkaline earth metals, such as sodium methylate, calcium methylate, sodium phenolate, potassium phenolate, sodium and potassium phenolates of the diphenols described above, hydrides such as lithium hydride, sodium borohydride and calcium hydride, oxides such as lithium oxide, sodium oxide and barium oxide, amides such as sodium amide and calcium amide, aromatic nitrogen bases such as imidazole, tetraalkyl titanates such as titanium tetraethylate, tetraisopropylate and tetrabutylate, dialkyl-tin oxides such as dibutyl-tin oxide, dialkyldialkoxy-tin compounds such as dibutyldimethoxy-tin, alkyl-tin carboxylates such as tributyltin acetate and dibutyl-tin dilaurate, and mixtures of these compounds. The catalysts can be used in quantities of 0.005 to 5, preferably 0.05 to 2, % by weight relative to diphenols employed.

The first process stage is in general carried out at temperatures from 80 to 340 and preferably 100° to 320° C., optionally under reduced pressure, the liberated phenols being distilled off. If it is intended to produce branched oligophosphonates, tri- or tetra-functional compounds such as triaryl phosphates, for example triphenyl phosphate, tri- or tetra-phenols with one or more aromatic rings, aryl esters of tribasic or tetrabasic aromatic carboxylic acids such as, for example, trimesic acid triphenyl ester or pyromellitic acid tetraphenyl ester, are employed as branching agents.

Aromatic dicarboxylic acid dichlorides preferred for the second process stage are the dichlorides of o-phthalic acid, isophthalic acid and terephthalic acid, of the diphenyldicarboxylic acids, of the diphenyl etherdicarboxylic acids, of the naphthalenedicarboxylic acids and of mixtures of these dicarboxylic acids. Isophthalic/terephthalic acid dichloride mixtures in a ratio of 3:7 to 7:3 are particularly preferred dichlorides.

For the phase boundary reaction, onium compounds such as quaternary phosphonium compounds, for example triphenylbenzylphosphonium chloride, triphenylmethylphosphonium iodide and triphenylethylphosphonium chloride, such as quaternary ammonium compounds, for example trimethylbenzylammonium chloride, triethylbenzylammonium bromide and tetrabutylammonium bromide, such as quaternary arsonium compounds, for example methyltriphenylarsonium iodide and benzyltriphenylarsonium bromide, and tertiary amines such as, for example, triethylamine, tributylamine, N-ethylpiperidine and N-ethylmorpholine can be used as catalysts. The phase boundary catalysts are employed as a rule in quantities from 0.02 to 20 and preferably from 0.2 to 15 mol% relative to the phenolic OH groups to be reacted.

A preferred pH range for the phase boundary reaction is from 8 to 13.

Preferred solvents for the aromatic dicarboxylic acid dichlorides and for the polyester-phosphonates formed during the reaction are water-immiscible halogenated hydrocarbons such as, for example, methylene chloride, chloroform, di-, tri- and tetrachloroethanes, chlorobenzene, dichlorobenzenes and mixtures of these solvents.

The branching agents used for the polyesterphosphonates to be prepared according to the invention can be, for example, phosphorus oxytrichloride, phosphorus trichloride, trifunctional or polyfunctional carboxylic acid chlorides such as trimesic acid trichloride, cyanuric acid trichloride, 3,3′,4,4′-benzophenonetetracarboxylic acid tetrachloride, 1,4,5,8-naphthalenetetracarboxylic acid tetrachloride or pyromellitic acid tetrachloride, in quantities from 0.01 to 2.0 mol% (relative to the diphenol radicals present in the end product) or 3-functional or polyfunctional phenols, such as phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis-(4-hydroxyphenyl)-cyclohexyl]-propane, 2,4-bis-(4-hydroxyphenyl-isopropyl)-phenol, tetra-(4-hydroxyphenyl)-methane, 2,6-bis-(2-hydroxy-5-methylbenzyl)-4-methylphenol, 2-(4-hydroxyphenyl)-2-(2,4-dihydroxyphenyl)propane, tetra-(4-[4-hydroxyphenyl-isopropyl]-phenoxy)methane and 1,4-bis-[(4,4″-dihydroxytriphenyl)-methyl]benzene in quantities from 0.01 to 2.0 mol% (relative to the diphenol radicals present in the end product). Phenolic branching agents can be introduced initially with the diphenols, and acid chloride branching agents can be introduced together with the acid dichlorides.

To limit the molecular weight of the polyesterphosphonates to be prepared according to the invention, chain stoppers can be added in the second process stage. Preferred chain stoppers are of the formula

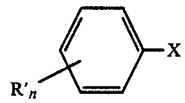

wherein
R′ denotes an aliphatic or aromatic hydrocarbon radical having 1 to 18, preferably 6 to 12 and especially 8 or 9 carbon atoms,
n denotes zero or an integer from 1 to 5 and
X denotes

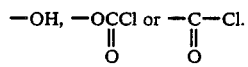

The chain stoppers are preferably added in quantities of up to 10 and preferably up to 7.5 mol% relative to the diphenol radicals present in the end product.

For the second process stage, and oligophosphonate obtained in the first process stage is dissolved in the organic phase. If appropriate, the diphenols are dissolved in the aqueous-alkaline phase; to avoid undesired discolourations of the end products, small quantities of reducing agents such as, for example, sodium borohydride or sodium sulphite, can be introduced into the aqueous phase. A solution of the aromatic dicarboxylic acid dichlorides and/or phosgene is added—simultaneously or successively—with vigorous stirring. The temperature is preferably kept within a range from 0° to 40° C.

The end product can be isolated in the manner customary for phase boundary processes: accordingly, the organic phase is separated off, washed until free from salt and evaporated. The last stage of the working-up can preferably taken place in an evaporative extruder.

The copolyphosphonates prepared according to the invention are predominantly used for the production of mouldings which are to have a high notched impact strength, for example multipoint connectors, lamp holders and switch casings.

Processing is a rule by injection-moulding at melt temperatures of 280° to 360° C. and at mould temperatures of 80° to 150° C., preferably 90° to 120° C.

EXAMPLES

The relative viscosity $\eta_{rel}$ was determined on a solution of 0.5 g of substance in 100 ml of dichloromethane solution at 25° C.

The impact strength $a_n$ and the notched impact strength $a_k$ were tested by the Charpy method according to DIN 53,453.

A.

PREPARATION OF THE OLIGOPHOSPHONATES

Example 1

(6 moles of diphenol/5 moles of phosphonic acid ester)

5,750 g of bisphenol A, 5,180 g of methylphosphonic acid diphenyl ester and 36 g sodium phenolate were mixed under nitrogen at 180° C. In the course of 3 hours, phenol was distilled off through a column under a pressure decreasing from 450 to 200 mbar. In the course of a further 2.5 hours, the pressure was then reduced to 10 mbar, the temperature was increased to 200° C. and more phenol was distilled off. The residual phenol passed over at 200° C./0.5 mbar. Nitrogen was admitted to the reaction vessel, and the product was poured onto a metal sheet and cooled.

OH number: 66.

Example 2

(3 moles of diphenol/2 moles of phosphonic acid ester)

6,840 g of bisphenol A; 4960 g of methylphosphonic acid diphenyl ester and 35 g of sodium phenolate were reacted as described in Example 1.

OH number: 130.

Example 3

(9 moles of diphenol/8 moles of phosphonic acid ester)

6,156 g of bisphenol A, 5,952 g of methylphosphonic acid diphenyl ester and 35 g of sodium phenolate were reacted as described in Example 1.

OH number: 47.

Example 4

(4 moles of diphenol/3 moles of phosphonic acid ester)

5,477 g of bisphenol A, 4,464 g of methylphosphonic acid diphenyl ester and 34 g of sodium phenolate were reacted as described in Example 1.

OH number: 105.

B.

Conversion of the oligophosphonates in the phase boundary process

Example 5

777.6 g of bisphenol A and 18 g of tetrabutylammonium bromide were dissolved in 35.8 kg of water and 828 g of 45% by weight sodium hydroxide solution. 1,310 g of oligophosphonate from Example 4, dissolved in 23.3 kg of dichloromethane, were added with stirring.

This mixture was combined with 1,887 g of a 40% by weight solution of isophthalic/terephthalic acid dichloride (1:1) in dichloromethane. 300 g of phosgene were then introduced, the pH value being kept at 9 to 11 by the addition to dilute sodium hydroxide solution. After the end of the introduction of phosgene, 4.8 ml of N-ethylpiperidine were added and the mixture was allowed to react for 1 further hour. Through the entire reaction the temperature of the reaction mixture was 20° to 25° C.

After the aqueous-alkaline phase had been separated off, the organic phase was first washed with dilute phosphoric acid and then with water until salt-free, and about 50% of the dichloromethane was distilled off under normal pressure. The remaining solution was diluted with 10 l of chlorobenzene and removal of the dichloromethane by distillation was continued until the bottom temperature was about 80° C., and the polyester-phosphonate was then freed from chlorobenzene in a vacuum extruder at 320° C., taken off as a strand and granulated. The granulated product has a relative solution viscosity $\eta_{rel}$ of 1.245 and a phenolic OH content of 0.01% by weight.

Example 6

1,280 g of bisphenol A and 9 g of tetrabutylammonium bromide were dissolved in 36 kg of water and 1,272 g of 45% by weight sodium hydroxide solution. 655 g of oligophosphonate from Example 4, dissolved in 17.9 l of dichloromethane, were added with stirring.

This mixture was combined with 2,413 g of a 40% by weight solution of isophthalic/terephthalic acid dichloride (1:1) in chlorobenzene. 350 g of phosgene were then introduced, the pH value being kept at 9 to 11 by the addition of dilute sodium hydroxide solution. After the end of the phosgene introduction, 12 g of phenol and 2.4 ml of N-ethylpiperidine were added and the mixture was allowed to react for 1 further hour. Working-up was carried out analogously to Example 5.

$\eta_{rel}$=1.312; phenolic OH content: 0.005% by weight.

Example 7

According to the procedure described in Example 5, 913 g of bisphenol A were dissolved in 32 l of water and 907 g of 45% by weight sodium hydroxide solution, and 875 g of oligophosphonate from Example 4, dissolved in 16 l of dichloromethane, 1,502 g of a 40% by weight solution of isophthalic/terephthalic acid dichloride (1:1) in dichloromethane and 260 g of phosgene were added. 12 g of tetrabutylammonium bromide and 3.2 ml of N-ethylpiperidine were used as catalysts.

$\eta_{rel}$=1.303; phenolic OH content: 0.02% by weight.

Example 8

According to the procedure described in Example 6, 2,096 g of bisphenol A were dissolved in 50 l of water and 1,740 g of 45% by weight sodium hydroxide solution and reacted with 834 g of oligophosphonate from Example 1, dissolved in 25 l of dichloromethane, 2,041 g of a 40% by weight solution of isophthalic/terephthalic acid dichloride (1:1) in dichloromethane and 1,120 g of phosgene. 47.5 g of phenol were used as a chain stopper, and 31.2 g of tetrabutylammonium bromide and 20.5 ml of N-ethylpiperidine were used as catalysts.

$\eta_{rel}$=1.292; phenolic OH content: 0.013% by weight.

Example 9

Analogously to Example 6, 1,430 g of bisphenol A were dissolved in 50 l of water and 1,305 g of 45% by weight sodium hydroxide solution and reacted with 1,668 g of oligophosphonate from Example 1, dissolved in 25 l of dichloromethane, 1,531 g of a 40% by weight solution of isophthalic/terephthalic acid dichloride (1:1) in dichloromethane and 900 g of phosgene. 10.2 g of phenol were used as the chain stopper, and 23.4 g of tetrabutylammonium bromide and 15.2 ml of N-ethylpiperidine were used as catalysts.

$\theta_{rel}$=1.251; phenolic OH content: 0.023% by weight.

Example 10

2,788 g of bisphenol A, 18.9 g of phenol and 42.5 g of tetrabutylammonium bromide were dissolved in 65 l of water and 2,373 g of 45% by weight sodium hydroxide solution. 1,668 g of oligophosphonate from Example 1, dissolved in 33 l of dichloromethane, were added with stirring. 1,700 g of phosgene were introduced into this mixture. 27.9 ml of N-ethylpiperidine were added, and the mixture was allowed to react for 1 further hour and worked up analogously to Example 5.

$\eta_{rel}$=1.310; phenolic OH content: 0.018% by weight.

Example 11

Analogously to Example 10, 3,800 g of bisphenol A, 24 g of phenol and 54.7 g of tetrabutylammonium bromide were dissolved in 64.3 l of water and 3,051 g of 45% by weight sodium hydroxide solution. 556 g of oligophosphonate from Example 1, dissolved in 33 l of dichloromethane, were added with stirring.

2,400 g of phosgene were introduced into this mixture. 36 ml of N-ethylpiperidine were then added, and the mixture was allowed to react for 1 further hour and was worked up in analogy to Example 5.

$\eta_{rel}$=1.315; phenolic OH content: 0.01% by weight.

Comparison 5a 2,926 g of bisphenol A, 1,378 g of methylphosphonic acid diphenyl ester, 1,714 g of isophthalic/tetephthalic acid diphenyl ester (1:1), 541 g of diphenyl carbonate and 0.5 g of sodium phenolate were intensively stirred under nitrogen at 250° C. Phenol was then distilled off through a column heated to 100° C. in the course of 5 hours at a temperature rising from 250° C. to 280° C. and under a pressure gradually decreasing from 250 mbar to 10 mbar. The reaction was then continued for 1.5 hours at 290° to 310° C. and under a pressure of 0.3 mbar, the speed of rotation of the stirrer decreasing to a constant value. After nitrogen had been admitted to the stirred autoclave, the polyester-phosphonate was allowed to settle for 1 hour at 300° C., with the stirrer at rest, and the cocondensate was then isolated by spinning off under pressure (about 10 bar) and granulation of the melt strand.

$\eta_{rel}$=1.322.

Comparison 6a 1,420 g of bisphenol A, 344 g of methylphosphonic acid diphenyl ester, 1,143 g of isophthalic/terephthalic acid diphenyl ester (1:1), 339 g of diphenyl carbonate and 0.3 g of sodium phenolate were reacted analogously to Comparison 5a.

$\eta_{rel}$=1.306.

Comparison 7a 1,445 g of bisphenol A, 517 g of methylphosphonic acid diphenyl ester, 1,000 g of isophthalic/terephthalic acid diphenyl ester (1:1), 304 g of diphenyl carbonate and 0.2 g of sodium phenolate were reacted analogously to Comparison 5a.

$\eta_{rel}$=1.282.

Comparison 8a 773.5 g of bisphenol A, 172 g of methylphosphonic acid diphenyl ester, 357 g of isophthalic/terephthalic acid diphenyl ester (1:1), 373.5 g of diphenyl carbonate and 0.2 g of sodium phenolate were reacted analogously to Comparison 5a.

$\eta_{rel}$=1.312.

Comparison 9a 778 g of bisphenol A, 344.4 g of methylphosphonic acid diphenyl ester, 268 g of isophthalic/terephthalic acid diphenyl ester (1:1), 289.2 g of diphenyl carbonate and 0.3 g of sodium phenolate were reacted analogously to Comparison 5a.

$\eta_{rel}$=1.275.

Comparison 10a 2,503 g of bisphenol A, 2,354 g of diphenyl carbonate, 243 g of methylphosphonic acid diphenyl ester and 0.1 g of sodium phenolate were intensively stirred under nitrogen at 230° C. phenol was then distilled off through a column heated to 100° C. in the course of 5 hours at a temperature rising from 230° C. to 280° C. and under a pressure gradually decreasing from 250 mbar to 10 mbar. The reaction was then continued for 1.5 hours at 290° to 310° C. and under a pressure of 0.3 mbar, the speed of rotation of the stirrer decreasing to a constant value. After nitrogen had been admitted to the stirred autoclave, the polyester-phosphonate was allowed to settle for 1 hour at 300° C., with the stirrer at rest, and the cocondensate was then isolated by spinning off under pressure (about 10 bar) and granulation of the melt strand.

$\eta_{rel}$=1.330.

Comparison 11a 3,142 g of bisphenol A, 937 g of methylphosphonic acid diphenyl ester, 2,354 g of diphenyl carbonate and 0.2 g of sodium phenolate were intensively stirred under nitrogen at 230° C. Phenol was then distilled off through a column heated to 100° C. in the course of 5 hours at a temperature rising from 230° C. to 280° C. and under a pressure gradually decreasing from 250 mbar to 10 mbar. The reaction was then continued for 1.5 hours at 290° to 310° C. and under a pressure of 0.3 mbar, the speed of rotation of the stirrer decreasing to a constant value. After nitrogen had been admitted to the stirred autoclave, the polyester-phosphonate was allowed to settle for 1 hour at 300° C., with the stirrer at rest, and the cocondensate was then isolated by spinning off under pressure (about 10 bar) and granulation of the melt strand.

$\eta_{rel} = 1.38$.

TABLE

| Example/Comparison | $a_k$ [kJ/m$^2$] |
|---|---|
| 5/5a | 7/2 |
| 6/6a | 27/5 |
| 7/7a | 10/3 |
| 8/8a | 15/3 |
| 9/9a | 9/2 |
| 10/10a | 12/4 |
| 11/11a | 25/3 |

Impact strength $a_n$: all samples "not broken".

We claim:

1. Process for the preparation of aromatic polyester-phosphonate, polycarbonatophosphonate or polyester-carbonatophosphonate, each having a number average molecular weight of 5,000 to 200,000 and with molar phosphonate groups/(carboxylate plus carbonate groups) ratio of 95:5 to 5:95 from (1) at least one diphenol, (2) at least one phosphonic acid derivative and (3) at least one aromatic dicarboxylic acid derivative, phosgene or a mixture of both;

wherein in a first stage, phosphonic acid diaryl ester is reacted in the melt with diphenol until an oligomeric product having a number average molecular weight of 460 to 20,000 and an OH number of 5 to 240 has been formed, and then, in a second stage, the oligomeric product is condensed by the phase boundary process with aromatic dicarboxylic acid dichloride or phosgene, or a mixture of both, until the phenolic OH content is less than 0.1% by weight relative to the resulting condensate product.

2. Process according to claim 1 wherein the aromatic polyester-phosphonate has molecular weights, determined as the number averages, of 10,000 to 150,000.

3. Process according to claim 1 wherein the aromatic polyester-phosphonate has molecular weights, determined as the number averages, of 12,000 to 80,000.

4. Process according to claim 1 the aromatic polyester-phosphonate has molar phosphonate groups/(carboxylate plus carbonate groups) ratios of 80:20 to 10:90.

5. Process according to claim 1 wherein the aromatic polyester-phosphonate has molar phosphonate groups/(carboxylate plus carbonate groups) ratios of 65:35 to 10:90.

6. Process according to claim 1 wherein the first process stage is continued until an oligomeric product with a molecular weight, determined as the numer average, of 800 to 10,000 and an OH number of 10 to 140 has been formed.

7. Process according to claim 1 wherein the second process stage is continued until the phenolic OH content is less than 0.05% by weight relative to the resulting polyester-phosphonate.

8. Process according to claim 1 wherein bisphenol A is employed as the diphenol (1).

9. Process according to claim 1 wherein methylphosphonic acid diphenyl ester is the phosphonic acid derivative (2).

10. Process according to claim 1 wherein a mixture of isophthalic and terephthalic acid dichloride in a ratio of 3:7 to 7:3 is the aromatic dicarboxylic acid derivative (3).

* * * * *